United States Patent
Migacz et al.

(10) Patent No.: US 10,997,492 B2
(45) Date of Patent: May 4, 2021

(54) AUTOMATED METHODS FOR CONVERSIONS TO A LOWER PRECISION DATA FORMAT

(71) Applicant: NVIDIA Corporation, Santa Clara, CA (US)

(72) Inventors: Szymon Migacz, Santa Clara, CA (US); Hao Wu, San Jose, CA (US); Dilip Sequeira, Seattle, WA (US); Ujval Kapasi, San Jose, CA (US); Maxim Milakov, Moscow (RU); Slawomir Kierat, Mountain View, CA (US); Zacky Zhou, Shanghai (CN); Yilin Zhang, Shanghai (CN); Alex Fit-Florea, Belmont, CA (US)

(73) Assignee: Nvidia Corporation, Santa Clara, CA (US)

( * ) Notice: Subject to any disclaimer, the term of this patent is extended or adjusted under 35 U.S.C. 154(b) by 797 days.

(21) Appl. No.: 15/838,273

(22) Filed: Dec. 11, 2017

(65) Prior Publication Data

US 2018/0211152 A1    Jul. 26, 2018

Related U.S. Application Data

(60) Provisional application No. 62/448,909, filed on Jan. 20, 2017.

(51) Int. Cl.
*G06N 3/04*    (2006.01)
*G06N 3/08*    (2006.01)
(Continued)

(52) U.S. Cl.
CPC ............ *G06N 3/04* (2013.01); *G06N 3/0454* (2013.01); *G06N 3/08* (2013.01); *G06N 3/049* (2013.01);
(Continued)

(58) Field of Classification Search
CPC .......... G06N 3/04; G06N 3/0454; G06N 3/08; G06N 7/00; G06N 3/063; G06N 3/049; G06N 3/0635; G06N 3/10; G06N 3/02
(Continued)

(56) References Cited

U.S. PATENT DOCUMENTS

| | | | | |
|---|---|---|---|---|
| 5,872,864 A | * | 2/1999 | Imade | ................ G06K 9/00456 382/156 |
| 7,603,329 B2 | | 10/2009 | Wocke et al. | |

(Continued)

FOREIGN PATENT DOCUMENTS

| | | |
|---|---|---|
| CN | 101145787 | 3/2008 |
| CN | 101908891 | 12/2010 |

(Continued)

OTHER PUBLICATIONS

Naveen Mellempudi; et al. Intel Labs. Ternary Neural Networks with Fine-Grained Quantization. Cornell University Library. (Submitted on May 2, 2017 (v1), last revised May 30, 2017 (this version, v3)) 11 pages. https://arxiv.org/pdf/1705.01462.pdf.

(Continued)

*Primary Examiner* — Ly D Pham
(74) *Attorney, Agent, or Firm* — Hogan Lovells US LLP (57) ABSTRACT

Aspects of the present invention are directed to computer-implemented techniques for performing data compression and conversion between data formats of varying degrees of precision, and more particularly for improving the inferencing (application) of artificial neural networks using a reduced precision (e.g., INT8) data format. Embodiments of the present invention generate candidate conversions of data output, then employ a relative measure of quality to identify the candidate conversion with the greatest accuracy (i.e., least divergence from the original higher precision values).

(Continued)

The representation can be then be used during inference to perform computations on the resulting output data.

28 Claims, 4 Drawing Sheets

(51) Int. Cl.
    *G06N 3/063*     (2006.01)
    *G06N 3/02*     (2006.01)
    *G06N 3/10*     (2006.01)
    *G06N 7/00*     (2006.01)
    *G06T 9/00*     (2006.01)

(52) U.S. Cl.
    CPC ............... *G06N 3/063* (2013.01); *G06N 3/10* (2013.01); *G06N 7/00* (2013.01); *G06T 9/002* (2013.01)

(58) Field of Classification Search
    USPC .......................................... 706/27, 26, 15, 33
    See application file for complete search history.

(56) References Cited

U.S. PATENT DOCUMENTS

| | | | |
|---|---|---|---|
| 8,315,954 B2 | 11/2012 | Kobayashi | |
| 8,374,974 B2 | 2/2013 | Chen et al. | |
| 8,862,527 B2 | 10/2014 | Garner | |
| 9,607,366 B1 * | 3/2017 | Brailovskiy | G06T 5/009 |
| 2003/0184459 A1 | 10/2003 | Engl | |
| 2004/0125877 A1 * | 7/2004 | Chang | H04N 21/2343 375/240.28 |
| 2008/0037949 A1 * | 2/2008 | Morita | G11B 27/28 386/278 |
| 2008/0114644 A1 * | 5/2008 | Frank | G06Q 30/0603 705/14.73 |
| 2016/0123943 A1 | 5/2016 | Li | |
| 2016/0328646 A1 | 11/2016 | Lin et al. | |
| 2017/0061279 A1 | 3/2017 | Yang et al. | |

FOREIGN PATENT DOCUMENTS

| | | |
|---|---|---|
| CN | 102262198 | 11/2011 |
| CN | 102663451 | 9/2012 |
| CN | 103356163 | 10/2013 |
| CN | 104008430 | 8/2014 |
| CN | 105471431 | 4/2016 |
| CN | 105781539 | 7/2016 |
| CN | 106845640 | 6/2017 |
| CN | 106845640 A | 6/2017 |
| JP | 2012150552 | 8/2012 |
| WO | 2003081527 | 10/2003 |
| WO | 2003081527 A1 | 10/2003 |
| WO | 2015143435 | 9/2015 |

OTHER PUBLICATIONS

Chen; et al. Fxpnet: Training Deep Convolutional Neural Network In Fixed-Point Representation. International Joint Conference on Neural Networks (IJCNN 2017) May 14, 2017. 8 pages.

Philipp Gysel; et al. Hardware-Oriented Approximation of Convolutional Neural Networks. Department of Electrical and Computer Engineering. University of California, Davis. Davis, CA 95616. https://arxiv.org/pdf/1604.03168.pdf. Oct. 20, 2016.

Ma Yan, et al, "Relationships Between Physical-mechanical Parameters and Collapsibility of Loess Soil and Its Prediction Model", *Bulletin of Soil and Water Conservation*, 1, p. 120-128 (2016).

Chun-hui Zhao, et al, "An improved compressed sensing reconstruction algorithm based on artificial neural network", *2011 International Conference on Electronics, Communications and Control(ICECC)*, Date of Conference: Sep. 9-11, 2011, https://doi.org/10.1109/ICECC.2011.6066532.

First Office Action issued in CN Application No. 201810058512.1 dated Jan. 26, 2021.

* cited by examiner

Exemplary Computer System 400

Figure 4

AUTOMATED METHODS FOR CONVERSIONS TO A LOWER PRECISION DATA FORMAT

CLAIM OF PRIORITY

The present invention claims priority to provisional patent application Ser. No. 62/448,909, filed on Jan. 20, 2017, entitled "Automated Method for Conversion to a Lower Precision Data Format," which is also incorporated by reference herein.

FIELD OF THE INVENTION

Embodiments of the present invention refer generally to computer-implemented techniques for data compression and information recoding. More specifically, embodiments of the present invention are directed to a system for improved inferencing of deep learning for neural and convolutional networks.

BACKGROUND OF THE INVENTION

Machine learning is the field of computer science directed to the use of computer-implemented algorithms for problem solving through pattern recognition and adaptive processing of a data set. In contrast with regular "static" programming, machine learning applications are characterized by being able to generate predictive data models by iteratively refining models from a data set without explicit programming. Artificial neural networks are among the most popular machine learning algorithms, and use distributed parallel processors to perform parameterized computations on input data at multiple, interconnected "neurons" (processing units) distributed throughout one or more internal or "hidden" layers between an input layer and an output layer to calculate an output that is compared to a target or reference output. Artificial neural networks are parameterized through weights assigned to the connections between neurons of adjacent layers. The parameters of the networks are continuously updated to reduce and eventually eliminate the difference in output until an accurate data model is achieved. "Deep" neural networks refer to neural networks that consist of 3 or more layers.

One popular artificial neural network training method is called backward propagation (or back propagation). Beginning with a pre-determined (often random) set of weights, the weights are refined by repeatedly applying a two-phase cycle of operations that includes a forward pass followed by gradient backward propagation ("back propagation") phase in conjunction with an optimization phase. During the forward propagation phase, input is propagated forward through the neural network, with computation performed at each neuron, layer by layer, until it reaches the output layer. Non-linear activation functions may also be applied at one or more neurons to further direct output to discrete values. The output is then compared to the target output using a loss function, and an error value is calculated for each of the elements in the output layer. During back prop phase the gradients of error function are computed and then propagated backwards through the layers to determine gradients corresponding to each neuron. These gradients are then used to calculate the gradient of the loss function with respect to each of the weights in the network. In the last phase, the calculated gradient is used to update the applied weights in an attempt to minimize the loss function. Once the actual output substantially approximates the target output (e.g., within a threshold of accuracy), the data model is considered complete and further learning may be terminated.

After training of a neural network is completed, the networks can be deployed in the field for "inference," during which input data is classified by the output of the network to "infer" a result. Traditional computer implementations of neural network training (such as back propagation) typically use 32-bit floating-point (a.k.a. single-precision float or FP32) representations of real numbers for data storage and manipulation when performing data computations. Naturally, inference performed on these models also use FP32 representations. However, the memory storage and computation of 32-bit values requires considerable memory and processing resources. As a result, new techniques have been developed that rely instead on a reduced precision format. Instead of the full 32 bits, these solutions may instead use a 16 bit floating-point (float16) representation or 8 bit integer (INT8) representation.

Using reduced data precision formats for inferencing of neural (specifically convolutional) networks offers several advantages over traditional single-precision float formats. Specifically, these lower format computations can be performed (potentially) significantly faster than single-precision float for computationally intensive layers in the neural network. Significantly less memory is required for storing the reduced data precision values. Storage of data in the reduced data precision format also improves performance of bandwidth-limited layers, due to the reduced time necessary to transfer data. Finally, storage using the reduced data precision format also allows reductions to the size of the network and the time required to communicate for multi-processor (e.g., multi-GPU) systems.

Unfortunately, reduced data precision numbers have a significantly narrower numerical range than single-precision float representations. As a result, overflow or underflow can occur when computations are performed that result in numerical values outside of the prescribed ranges. Previously attempted solutions would require the application of constraints during training, or employ a more complex or challenging mathematical model that requires some amount of fine-tuning. Another shortcoming of these previously known methods is that quantization from larger sets of values (e.g., from single-precision float to a reduced precision format) is performed dynamically, and thus require additional processing overhead during computation.

SUMMARY OF THE INVENTION

This Summary is provided to introduce a selection of concepts in a simplified form that are further described below in the Detailed Description. This Summary is not intended to identify key features or essential features of the invention, nor is it intended to be used to limit the scope of the invention.

Embodiments of the present invention are directed to computer-implemented procedures for improving the inference (application) of artificial neural networks using a reduced precision (e.g., INT8) data format. Embodiments of the present invention generate candidate conversions of data output, then employ a relative measure of quality to identify the candidate conversion with the greatest accuracy (e.g., least divergence from the original higher precision values). The representation can be then be used during inference to compute the resulting output data.

According to one embodiment of the present invention, a computer-implemented process is provided for automating conversion from higher precision data formats to lower precision data formats. The process is performed by, for example, referencing pre-stored activation data, creating a histogram for the activation data, generating reduced precision distributions for the histogram with different saturation thresholds, measuring distributions for divergence against a higher precision reference distribution, and identifying the distribution with the least divergence from the reference distribution. In one or more embodiments, the process can be performed for each layer of a neural network. In still further embodiments, the process is performed for each layer independently with respect to any other layer of the neural network.

In one or more embodiments, the activation data may include data generated by applying a neural network to at least a portion of a calibration data set to determine one or more scaling factors to convert data from a higher precision format to a lower precision format. The calibration can be performed offline (e.g., before run-time inferencing) to statically determine the scaling factors. Activation data is generated for one or more layers of the neural network. The activation (output) data is then collected, stored, and a histogram of the data is subsequently created.

In one or more embodiments, generating the reduced precision distributions (candidate conversions) for a given histogram is performed iteratively over a plurality of different saturation levels corresponding to the number of candidate conversions. The specific number of candidate conversions may itself correspond to the range of values between 0 and the highest (maximum) value observed in the activation data, with each candidate conversion having a different saturation level between 0 and the highest observed absolute value. For each given candidate conversion, the values in the bins of the histogram above the saturation level corresponding to the candidate conversion are clamped to the saturation level. Subsequently, the bins of the histogram for the set of activated data values for a layer are then merged proportionally for all bins below the saturation threshold corresponding to the candidate conversion until the remaining number of bins corresponds to the maximum positive value for a selected lower precision data format. The candidate conversions are then compared using a divergence metric to the original data values to determine the candidate conversion with the greatest accuracy.

According to yet another embodiment of the present invention, a computer-readable medium including programmed instructions is provided that includes instructions to perform the process described above for automatically converting data from a higher precision data format to a lower precision data format, and a computer system is provided that includes a processor and a memory, wherein data values generated as output during inferencing operations are stored in the memory are automatically converted and processed using a reduced precision format.

Unlike conventional techniques, the inference performed by embodiments of the present invention do not require re-training or fine-tuning of the original FP32 network, or the application of constraints during training. Furthermore, data format conversions can be performed automatically and statically by running training calibration set, thereby eliminating the extra processing requirements for dynamic quantization of previously attempted solutions while achieving results comparable with those of the original FP32 network.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Reference will now be made in detail to the preferred embodiments of the invention. While the invention will be described in conjunction with the preferred embodiments, it will be understood that they are not intended to be limit to these embodiments. On the contrary, the invention is intended to cover alternatives, modifications and equivalents, which may be included within the spirit and scope as defined by the appended claims.

Furthermore, in the following detailed descriptions of embodiments of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing," "creating," "protecting," "receiving," "en-crypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Automated Conversion Between High and Low Precision Data Formats

Figure 1:
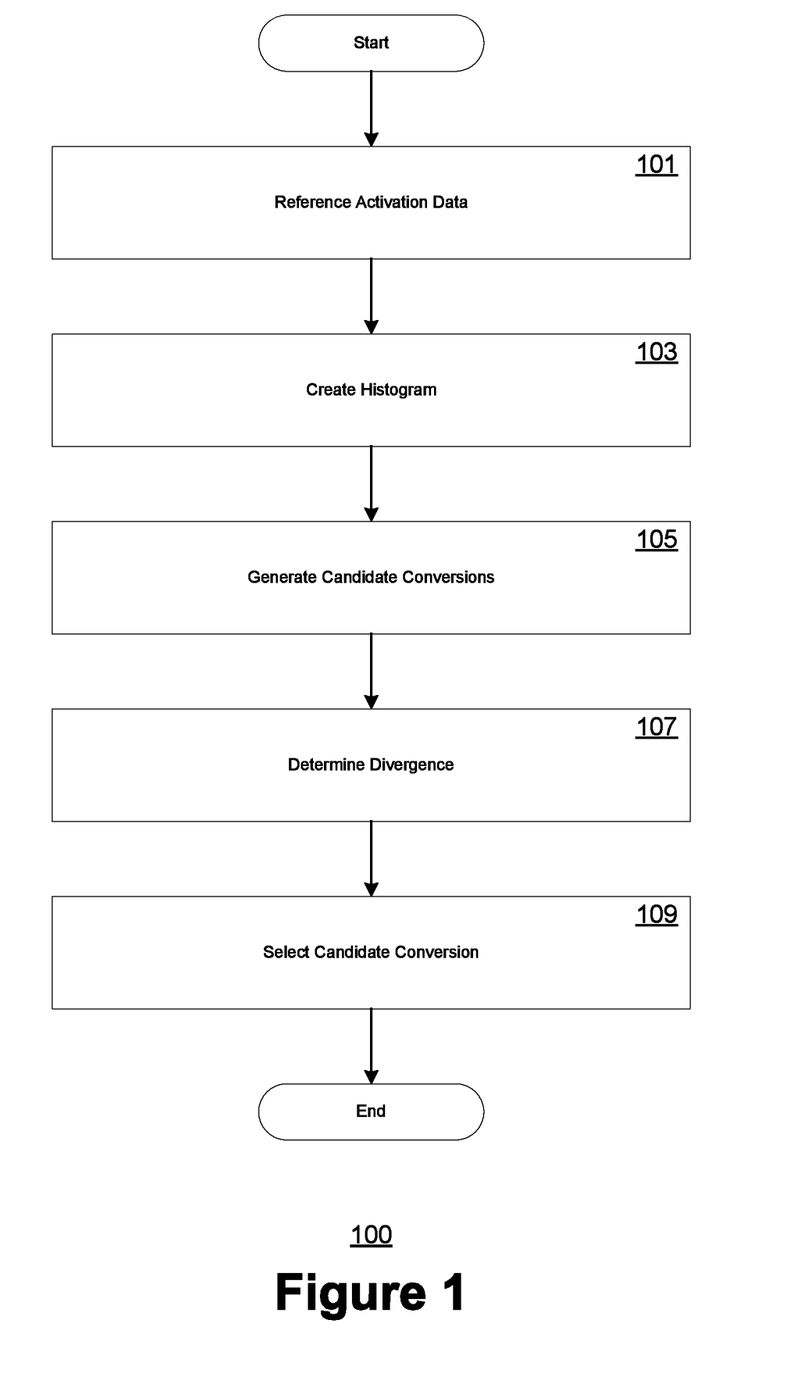
FIG. 1 depicts an exemplary computer-implemented method for automatically converting values from a higher precision data format to a lower precision data format, in accordance with various embodiments of the present invention.

FIG. 1 is a flowchart 100 that depicts an exemplary computer-implemented process for automating conversion from higher precision data formats to lower precision data formats, in accordance with embodiments of the present invention. Steps 101-109 describe exemplary steps of the flowchart 100 in accordance with the various embodiments herein described. As depicted in FIG. 1, automated conversion typically begins at step 101 by referencing activation data generated from an execution of one or more layers of a neural network. The activation data may comprise activation data corresponding to the output values from a single layer of the neural network, and referencing the pre-generated activation data may consist of accessing the activation data in a memory device, or generating the activation data during step 101. In one or more embodiments, the process depicted in flowchart 100 may be performed independently for multiple (all) layers of the neural network.

At step 103, the activation data referenced at step 101 is collected, and a histogram is created that collects like values in multiple bins. The histogram bins are equally spaced between the range of values from 0 and the highest observed absolute value of the activation values, with the activation values being collected in the histogram bin having the closest value. In one or more embodiments, the number of histogram bins itself may correspond to a pre-determined number. In still further embodiments, the pre-determined number may be empirically determined based on historical data corresponding to the neural network, and/or corresponding to the degree of precision of or between the data formats being converted from and/or to. In one specific embodiment, the histogram may consist of 2048 bins, or a number of bins approximating 2048 bins.

A plurality of lower precision distributions (e.g., candidate conversions) are generated for the values in the histogram at step 105. Generally, generation of the number of candidate conversions is based on both the number of bins in the histogram, and the specific lower precision data format the conversion is being performed for. Each candidate conversion is generated with a unique (relative to other candidate conversions) saturation threshold that corresponds to the data values collected in the histogram. Data values for a candidate conversion in the histogram that exceed the threshold for the candidate conversion are clamped to the threshold. As such, each of the candidate conversions will have a different range of data values. Generation of the candidate conversions is described in greater detail below, with respect to FIG. 3. At step 107, the divergence between each candidate conversion to a calibration data set (e.g., the starting higher precision data format values) is measured according to a metric to determine the candidate conversion with the least divergence. In one or more embodiments, the metric applied corresponds to the Kullback-Leibler divergence. At step 109, the candidate conversion with the least divergence (according to the metric applied at step 107) is selected and the data values resulting from the candidate conversion are used for inference applications such as data/image classification, facial or object recognition, etc.

Activation Data Collection

Figure 2:
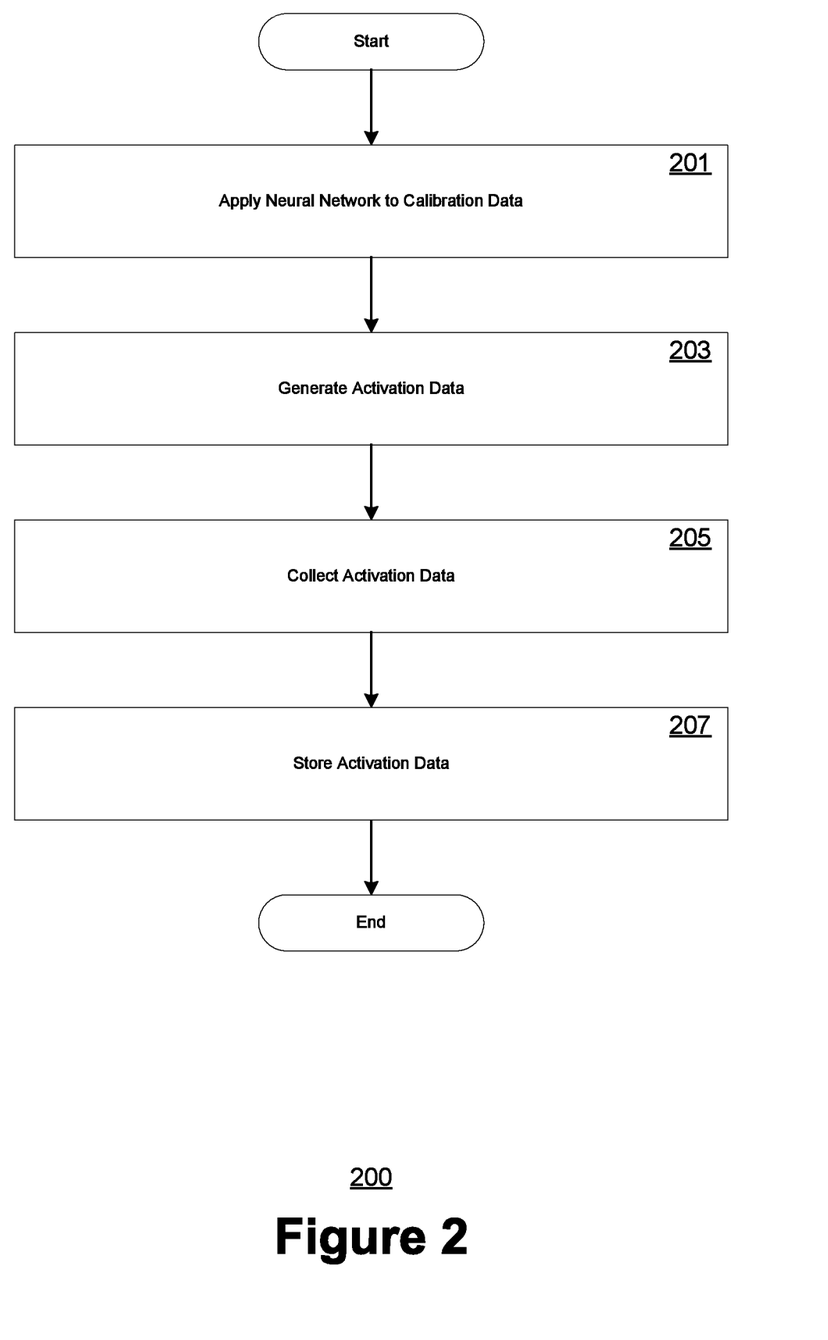
FIG. 2 depicts an exemplary computer-implemented method for generating activation data during a calibration operation in an artificial neural network, in accordance with various embodiments of the present invention.

FIG. 2 is a flowchart 200 that depicts an exemplary computer-implemented process for collecting activation data from a layer of a neural network for automated conversion of data values from a higher precision data format to a lower precision data format, in accordance with embodiments of the present invention. Steps 201-207 describe exemplary steps of the flowchart 200 in accordance with the various embodiments herein described. In one or more embodiments, one or more steps 201-207 may be performed during step 101 of the process depicted in flowchart 100 and described above with respect to FIG. 1. In further embodiments, one or more steps of flowchart 200 prior to the initiation of any of the steps of flowchart 100 to determine one or more scaling factors used to convert data from a higher precision format to a lower precision format. The calibration can be performed offline (e.g., before run-time inferencing) to statically determine the scaling factors.

As depicted in FIG. 2, collection of activation data begins at step 201 by applying a neural network to a calibration data set, or a portion thereof. Activation data is generated at step 203 during the routine execution of programmed operations in one or more layers of a neural network. The neural network may comprise a convolutional neural network, according to various embodiments. According to further embodiments, the neural network may also (or instead) comprise a deep neural network having three or more layers. The activation data may comprise activation data corresponding to the output values from a single layer of the neural network.

At step 205, the activation (output) data is then collected (e.g., in a processing cache), and stored (e.g., in a memory device) at step 207. In one or more embodiments, the activation data can be used to generate a histogram of the activation data, or in anticipation of creating a histogram of the data for the purposes of data format conversion.

Candidate Conversion Generation

Figure 3:
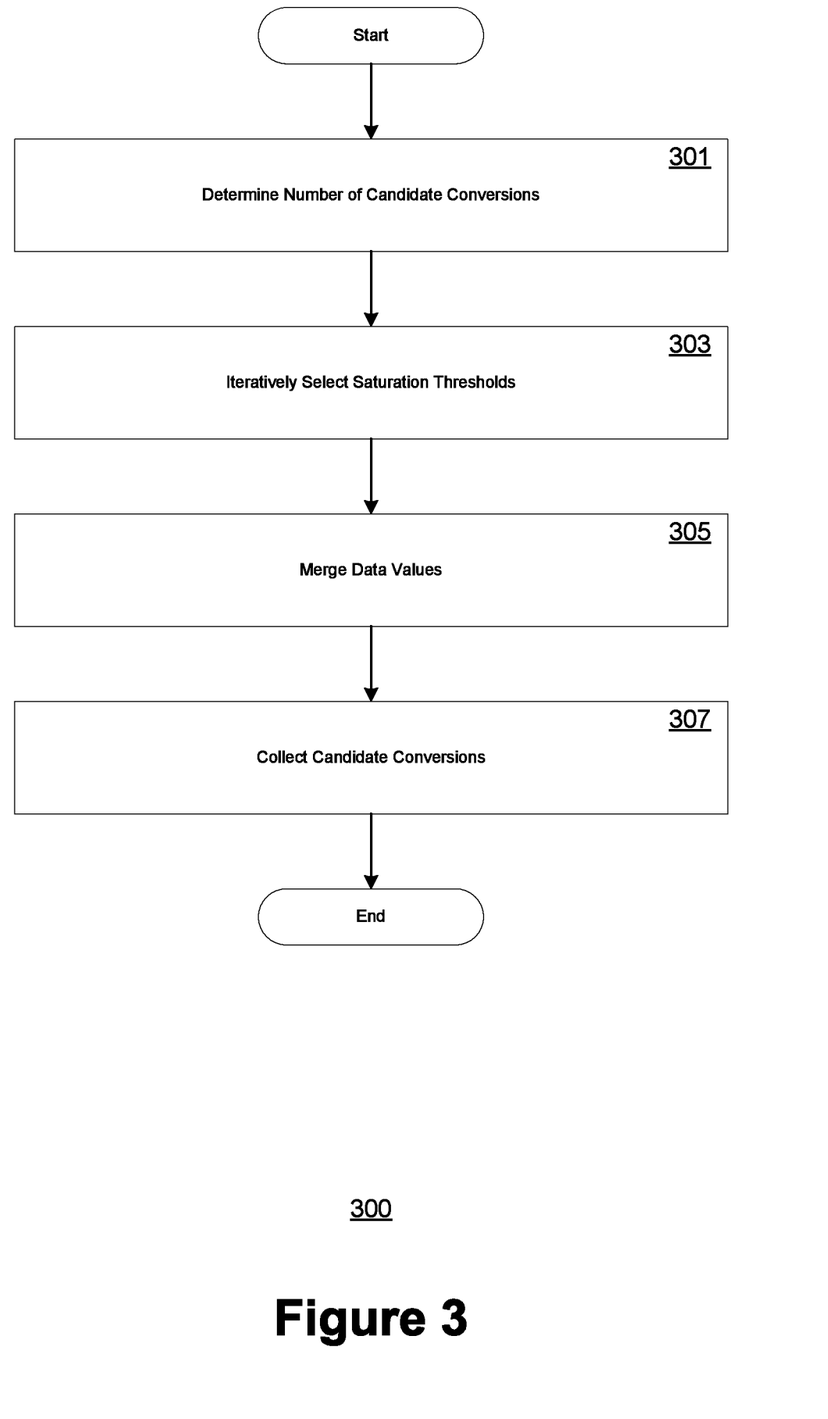
FIG. 3 depicts an exemplary computer-implemented method for generating candidate lower precision data format conversions from higher precision data format values, in accordance with various embodiments of the present invention.

FIG. 3 is a flowchart 300 that depicts an exemplary computer-implemented process for generating candidate conversion lower precision data values for automated conversion of data values from a higher precision data format to a lower precision data format, in accordance with embodiments of the present invention. Steps 301-307 describe exemplary steps of the flowchart 300 in accordance with the various embodiments herein described. In one or more embodiments, one or more steps 301-307 may be performed during step 105 of the process depicted in flowchart 100 and described above with respect to FIG. 1.

At step 301, the number of candidate conversions is determined and iteratively generated. In one or more embodiments, the number of candidate conversions may correspond to the number of bins in the histogram. In still further embodiments, the number of candidate conversions corresponds to the number of bins in the histogram minus the highest observed absolute number of the range of values expressible by the lower precision data format for which the conversion is being performed. Thus, if the lower precision data format selected for conversion is an 8-bit integer (Int8) format, the typical range of values expressible by Int8 is between −127 and 127. According to such embodiments, the number of candidate conversions would comprise some number between the number of histogram bins minus 127. For example, if the histogram consists of 2048 bins, the number of candidate conversions may be equal to 1921 (2048-127).

In one or more embodiments, each candidate conversion has a corresponding saturation threshold, such that any value above the threshold is clamped to the threshold. At step 303 a saturation threshold is selected for each candidate conversion. Each candidate conversion may thus be generated by iteratively clamping data values between 2048 and 127 in succession. At step 305, the remaining bins for each candidate conversion is sequentially compressed (merged) into a plurality of distribution intervals. In one or more embodiments, the number of distribution intervals corresponds to the highest observed absolute value expressible by the lower precision data format (e.g., 127 for Int8), and data values within each interval from the histogram between 0 and the saturation threshold are merged with the other data values in the same interval until the remaining number of bins is equal to the highest observed absolute value (e.g., 127).

For example, if the saturation value for a particular candidate conversion is equal to 1000, then the histogram bins between 0 and 1000 are divided into the maximum positive value expressible (e.g., 127 for Int8) to determine the closest integer to the quotient (e.g., 8). Discrete sequences of consecutive histogram bins between 0 and the saturation threshold (e.g., 1000) are then sequentially compressed (e.g., merged) until the number of histogram bins remaining corresponds to the highest observed absolute value. In the above example for 8 bit integer numbers, each sequence of 8 (quotient) histogram bins is merged so that remaining bins number 127. Every value above 1000 is clamped to the saturation threshold. Similarly, where the saturation threshold for a candidate conversion is 2000, each discrete sequence of 16 consecutive histogram bins are merged; and where the saturation threshold for a candidate conversion is 500, each discrete sequence of 4 consecutive histogram bins are merged.

The resulting merged and/or clamped data values are collected and stored as the candidate conversions at step 307. Thereafter, various metrics may be applied to measure the accuracy (inversely proportional to the divergence) of each candidate conversion to original data values from the calibration data set, in accordance with various embodiments.

A portion of exemplary pseudo-code is provided below. According to embodiments of the invention, computer readable medium containing programmed instructions that (at least) substantially perform the programmed instructions provided below may, when executed by a processor, be used to perform data compression and recoding from higher precision data formats to lower precision data formats generally, and more particularly for individual layers of an artificial neural network.

a.

$$\sum_i P(i)\log\left(\frac{P(i)}{Q(i)}\right)$$

Exemplary Pseudocode

---

Input: histogram 'bins' from fp32 run, contains 2048 bins

```
bins[0] = bins[1]
divergences = empty list
For i in range(128, 2048):
    candidate_distribution_Q = take bins from bins[0], ... , bins[i−1] and quantize into 128 levels
    reference_distribution_P = bins[0] , ... , bins[i−1]
    outliers_count = sum(bins[i], bins[i+1], ... , bins[2047])
    reference_distribution_P[ i−1 ] += outliers_count
    normalize reference_distribution_P (sum equal to 1)
    normalize candidate_distribution_Q (sum equal to 1)
    divergences[i] = KL_divergence(reference_distribution_P, candidate_distribution_Q)
Find index 'i' for which divergences[i] is minimal
Return i
Later this index is transformed into activation value:
    max_estimated_value = (i + 0.5) * bins.width_of_a_single_bin
```

Example

--- input distribution: [5 5 4 0 2 4 7 3 1 4 6 0 3 2 1 3], size: 16 bins
starting i: 8
quantizing input distribution into 4 bins
BEGIN ITERATION, i= 8
Q is built out of first 8 bins: [5 5 4 0 2 4 7 3]
building Q
linspace, edges of the quantized bins [ 0. 2. 4. 6. 8.]
indices of the bins after quantization [0 0 1 1 2 2 3 3]
after excluding empty bins (−1): [ 0 0 1 −1 2 2 3 3]
total counts in the quantized bins (merge) [ 10. 4. 6. 10.]
counts in the quantized bins, normalizing before expanding [ 5. 4. 3. 5.]
expanded bins [ 5. 5. 4. 0. 3. 3. 5. 5.]
expanded bins normalized (sum == 1) [ 0.16666667 0.16666667 0.13333333 0. 0.1 0.1 0.16666667 0.16666667]
building P
reference_density P [5 5 4 0 2 4 7 3]
reference_density P, after adding outliers [ 5 5 4 0 2 4 7 23]
reference_density P, normalized (sum=1) [ 0.1 0.1 0.08 0. 0.04 0.08 0.14 0.46]
final Q [ 0.16666667 0.16666667 0.13333333 0. 0.1 0.1 0.16666667 0.16666667]
final P [ 0.1 0.1 0.08 0. 0.04 0.08 0.14 0.46]
now we compute divergence
END ITERATION 8
BEGIN ITERATION, i= 9
Q is built out of first 9 bins: [5 5 4 0 2 4 7 3 1]

```
building Q
    linspace, edges of the quantized bins [ 0.   2.25 4.5 6.75 9. ]
    indices of the bins after quantization [0 0 0 1 1 2 2 3 3]
    after excluding empty bins (-1): [ 0 0 0 -1 1 2 2 3 3]
    total counts in the quantized bins (merge) [ 14. 2. 11. 4.]
    counts in the quantized bins, normalizing before expanding [ 4.66666667 2.     5.5
2.   ]
    expanded bins [ 4.66666667 4.66666667 4.66666667 0.    2.     5.5    5.5
       2.     2.    ]
    expanded bins normalized (sum == 1) [ 0.15053763 0.15053763 0.15053763 0.
0.06451613 0.17741935
      0.17741935 0.06451613 0.06451613]
    building P
    reference_density P [5 5 4 0 2 4 7 3 1]
    reference_density P, after adding outliers [ 5 5 4 0 2 4 7 3 20]
    reference_density P, normalized (sum=1) [ 0.1 0.1 0.08 0.      0.04 0.08 0.14 0.06
0.4 ]
    final Q [ 0.15053763 0.15053763 0.15053763 0.     0.06451613 0.17741935
      0.17741935 0.06451613 0.06451613]
    final P [ 0.1 0.1 0.08 0.   0.04 0.08 0.14 0.06 0.4 ]
    now we compute divergence
    END ITERATION 9
    BEGIN ITERATION, i= 10
    Q is built out of first 10 bins: [5 5 4 0 2 4 7 3 1 4]
    building Q
    linspace, edges of the quantized bins [ 0. 2.5 5. 7.5 10. ]
    indices of the bins after quantization [0 0 0 1 1 2 2 2 2 3 3]
    after excluding empty bins (-1): [ 0 0 0 -1 1 2 2 2 3 3]
    total counts in the quantized bins (merge) [ 14. 2. 14. 5.]
    counts in the quantized bins, normalizing before expanding [ 4.66666667 2.
4.66666667 2.5 ]
    expanded bins [ 4.66666667 4.66666667 4.66666667 0.    2.    4.66666667
      4.66666667 4.66666667 2.5     2.5   ]
    expanded bins normalized (sum == 1) [ 0.13333333 0.13333333 0.13333333 0.
0.05714286 0.13333333
      0.13333333 0.13333333 0.07142857 0.07142857]
    building P
    reference_density P [5 5 4 0 2 4 7 3 1 4]
    reference_density P, after adding outliers [ 5 5 4 0 2 4 7 3 1 19]
    reference_density P, normalized (sum=1) [ 0.1 0.1 0.08 0.   0.04 0.08 0.14 0.06
0.02 0.38]
    final Q [ 0.13333333 0.13333333 0.13333333 0.     0.05714286 0.13333333
      0.13333333 0.13333333 0.07142857 0.07142857]
    final P [ 0.1 0.1 0.08 0.   0.04 0.08 0.14 0.06 0.02 0.38]
    now we compute divergence
    END ITERATION 10
    Now iterations: 11, 12, 13, 14, 15, 16
```

Exemplary Computing Device

Figure 4:
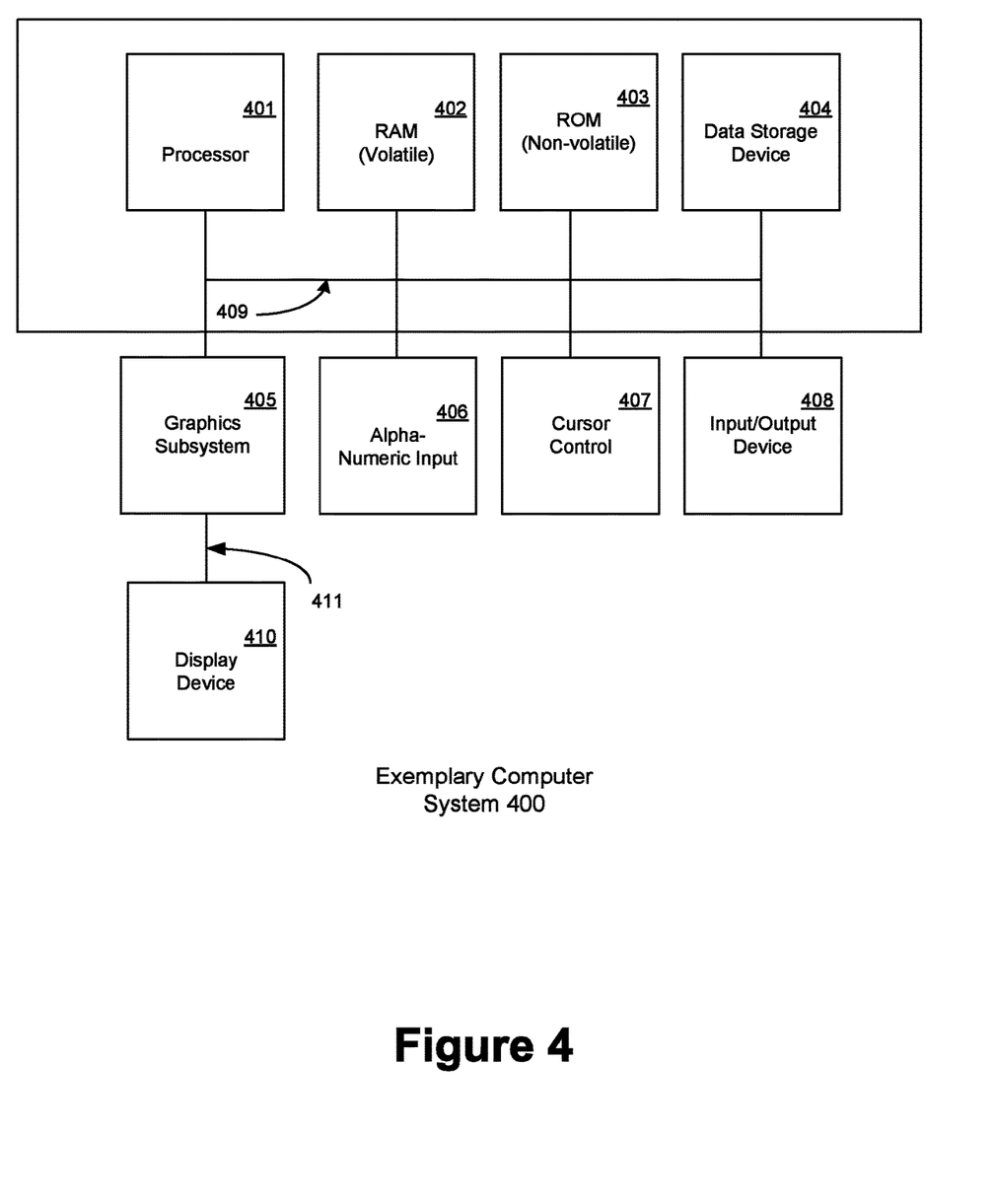
FIG. 4 depicts an exemplary computing system upon which embodiments of the present invention may be implemented, in accordance with various embodiments of the present invention.

As presented in FIG. 4, an exemplary computer system upon which embodiments of the present invention may be implemented includes a general purpose computing system with one or more integrated circuits, such as computing system 400. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two. In one or more embodiments, the processing unit 401 may be used to perform (in whole or in part) the operations or computations described above with respect to FIGS. 1-3 and the exemplary computer implemented processes and pseudo code and examples shown above.

Computer system 400 may also comprise an optional graphics subsystem 405 for presenting information to the computer user, e.g., by displaying information on an attached display device 410, connected by a video cable 411. According to embodiments of the present claimed invention, the graphics subsystem 405 may be coupled directly to the display device 410 through the video cable 411. A In alternate embodiments, display device 410 may be integrated into the computing system (e.g., a laptop or netbook display panel) and will not require a video cable 411. In one embodiment, the processes depicted in flowcharts 100, 200 and 300 may be performed, in whole or in part, by graphics subsystem 405 in conjunction with the processor 401 and memory 402. In one or more embodiments, converting of activation data in independent layers of a neural network by generating candidate conversions may be performed independently and simultaneously across multiple processors of at least one of the processor 401 and graphics subsystem 405.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 407. Computer storage media includes volatile and nonvolatile, removable and non-removable media implemented in any method or technology for storage of information such as computer readable instructions, data structures, program modules or other data. RAM 402, ROM 403, and data storage device 407 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for compressing data, the method comprising:
    referencing activation data for a layer of a neural network;
    creating a histogram of activation, the histogram comprising a plurality of bins, wherein the activation data is distributed across the plurality of bins;
    generating a plurality of candidate conversions based on the histogram, each conversion of the plurality of candidate conversions having a different saturation threshold;
    determining a divergence for each conversion of the plurality of candidate conversions from a calibration data set; and
    selecting the saturation threshold corresponding to the conversion with the least divergence from the reference higher precision distribution,
    wherein the plurality of candidate conversions are expressed in a lower precision format,
    further wherein at least one of the calibration data set and the activation data is expressed in the higher precision format.

2. The method of claim 1, wherein the creating, the generating, the determining, and the selecting are performed for each layer of the neural network.

3. The method of claim 1, wherein the determining the divergence comprises applying a metric for measuring directed divergence between the plurality of candidate conversions and the reference higher precision distribution.

4. The method of claim 3, wherein the metric comprises determining a Kullback-Leibler divergence.

5. The method of claim 1, wherein the plurality of candidate conversions comprise a plurality of quantized distributions of activations for the layer of the neural network that correspond to a range of values between 0 and a maximum absolute value comprised in the activation data.

6. The method of claim 1, wherein the referencing activation data comprises referencing activation data from a storage device, the activation data comprising output data generated by applying a neural network to a representative portion of the calibration data set.

7. The method of claim 6, wherein the referencing activation data from a storage device comprises:
    applying the neural network to a representative portion of the calibration data set;
    generating activation data corresponding to output produced from applying the neural network to the representative portion, the output being expressed in the higher precision format;
    collecting the activation data; and
    storing the activation data in a storage device.

8. The method of claim 1, wherein the generating the plurality of candidate conversions comprises:
    determining a number of candidate conversions for the plurality of candidate conversions;
    iteratively selecting a particular threshold from a plurality of saturation thresholds to correspond to a particular candidate conversion of the plurality of candidate conversions;
    merging data values from a consecutive sequence of bins from the histogram until a remaining number of bins in the histogram corresponds to a highest absolute value of the lower precision data format; and
    collecting the plurality of candidate conversions.

9. The method of claim 8, wherein for a particular threshold, all values from the histogram above the particular saturation threshold are clamped to the particular saturation threshold.

10. The method of claim 8, wherein the merging data values comprises merging consecutive sequences of bins from the histogram below the particular saturation threshold in substantially uniform intervals.

11. The method of claim 10, wherein the merging consecutive values comprises:
    dividing the bins of the histogram by a plurality of distribution intervals;
    determining a quotient value based on the dividing; and
    sequentially merging, for each distribution interval of the plurality of distribution intervals, an N number of values from the bins of the histogram, where N is equal to the quotient value.

12. The method of claim 10, wherein the plurality of distribution intervals corresponds to an absolute value expressed by the lower precision format.

13. The method of claim 10, wherein the lower precision format comprises an 8 bit integer (INT8) data format.

14. The method of claim 10, wherein the plurality of distribution intervals comprises 127 distribution intervals.

15. The method of claim 1, wherein the higher precision format comprises a 32 bit Floating-point (FP32) data format.

16. The method of claim 1, wherein the creating the histogram comprises creating the histogram with a pre-determined number of bins.

17. The method of claim 16, wherein the pre-determined number of bins comprises an empirically derived number of bins.

18. The method of claim 16, wherein the pre-determined number of candidate conversions comprises approximately 2048 candidate conversions.

19. A method for compressing data, the method comprising:
creating a histogram from an input data set, the histogram comprising a plurality of bins, wherein the data from the input data set is distributed across the plurality of bins;
generating a plurality of candidate conversions based on the histogram, each conversion of the plurality of candidate conversions having a different saturation threshold;
determining a divergence for each conversion of the plurality of candidate conversions from a calibration data set; and
selecting the saturation threshold corresponding to the conversion with the least divergence from the calibration data set,
wherein the plurality of candidate conversions are expressed in a lower precision format,
further wherein the input data set is expressed in the higher precision format.

20. The method of claim 19, wherein the generating the plurality of candidate conversions comprises:
determining a number of candidate conversions for the plurality of candidate conversions;
iteratively selecting a particular threshold from a plurality of saturation thresholds to correspond to a particular candidate conversion of the plurality of candidate conversions;
merging data values from a consecutive sequence of bins from the histogram until a remaining number of bins in the histogram corresponds to a highest observed absolute value of the lower precision data format; and
collecting the plurality of candidate conversions.

21. The method of claim 20, wherein for a particular threshold, all values from the histogram above the particular saturation threshold are clamped to the particular saturation threshold.

22. The method of claim 20, wherein the merging data values comprises merging data values comprised in the consecutive sequence of bins from the histogram in equal intervals.

23. The non-transitory computer readable medium of claim 22, wherein the instructions to merge consecutive values comprises:
instructions to divide the bins of the histogram by a plurality of distribution intervals;
instructions to determine a quotient value based on the dividing; and
instructions to sequentially merge, for each distribution interval of the plurality of distribution intervals, an N number of values from the bins of the histogram, where N is equal to the quotient value.

24. A system for performing data conversion between a higher precision data format to a lower precision data format, the system comprising:
a memory device, comprising a plurality of programmed instructions and storing a set of calibration data; and
a processor, coupled to the memory device and operable to execute the plurality of programmed instructions to perform data conversion by generating output data from a set of input data, creating a histogram based on the output data, generating a plurality of candidate conversions based on the histogram, each conversion of the plurality of candidate conversions having a different saturation threshold, determining a divergence for each conversion of the plurality of candidate conversions from a set of calibration data, and selecting the saturation threshold corresponding to the conversion with the least divergence from the set of calibration data,
wherein the plurality of candidate conversions are expressed in a lower precision format,
further wherein the calibration data set is expressed in the higher precision format.

25. The system of claim 24, wherein the processor is operable to generate the plurality of candidate conversions by:
determining a number of candidate conversions for the plurality of candidate conversions;
iteratively selecting a particular threshold from a plurality of saturation thresholds to correspond to a particular candidate conversion of the plurality of candidate conversions;
merging data values from a consecutive sequence of bins from the histogram until a remaining number of bins in the histogram corresponds to a highest observed absolute value of the lower precision data format; and
collecting the plurality of candidate conversions.

26. The system of claim 25, wherein for a particular threshold, all values from the histogram above the particular saturation threshold are clamped to the particular saturation threshold.

27. The system of claim 25, wherein the processor is operable to merge data values by merging data values comprised in consecutive sequences of bins from the histogram in substantially uniform intervals.

28. The system of claim 27, wherein the processor is operable to merge the consecutive values by dividing the bins of the histogram by a plurality of distribution intervals, determining a quotient value based on the dividing, and sequentially merging, for each distribution interval of the plurality of distribution intervals, an N number of values from the bins of the histogram, where N is equal to the quotient value.

* * * * *